April 9, 1935.  F. TUTTLE  1,997,325

METHOD AND APPARATUS FOR DUPLICATING GOFFERED FILM

Filed Feb. 14, 1933

Inventor:
Fordyce Tuttle,
By Newton M. Perriss
Rolla L. Carter
Attorneys.

Patented Apr. 9, 1935

1,997,325

UNITED STATES PATENT OFFICE 1,997,325

METHOD AND APPARATUS FOR DUPLICATING GOFFERED FILM

Fordyce Tuttle, Rochester, N. Y., assignor to Eastman Kodak Company, Rochester, N. Y., a corporation of New York Application February 14, 1933, Serial No. 656,685

11 Claims. (Cl. 88—24)

My present invention relates to photographic printing and more particularly to the copying or duplicating of goffered film by projection printing.

In the printing of color pictures on goffered or lenticular film it has been difficult to obtain prints of satisfactory definition and good color rendition due to color wedging and lack of color separation. As a consequence of my invention goffered film may be duplicated at a one to one ratio or the copy may be larger or smaller than the original without degrading the color saturation due to color splashing and flare introduced by the many surfaces of the printing objective.

In the present instance instead of printing all of the color separation images simultaneously I print them separately and successively. By printing in this manner, only the part of the light desired for printing is permitted to pass through the objective and the fogging effect of the flare introduced by the objective is greatly reduced with a consequent reduction in the loss of color saturation. The embossed sides of both films face the incident light and, in printing, each color portion on the original film is successively illuminated by a source of light which is made to appear in the position occupied by the corresponding color filter in taking and simultaneously therewith the light projected onto the sensitive film is restricted to corresponding portions of the sensitive film by permitting the light to pass through only the corresponding part of the objective. Since each color separation image is printed separately, the apparent angle subtended by the filter areas may readily be kept the same in the print as in the taking and this is true when the printing is done on an altered scale as well as when printing one to one. Also, because of the independence of the apertures subtended in taking and in the printed film, a relatively small aperture may be used in taking and the printing done with the required large aperture. This arrangement further permits control of the color ratio in printing thereby making it unnecessary to adjust this ratio by cutting out some of the light when projecting on a screen.

Figure 1:
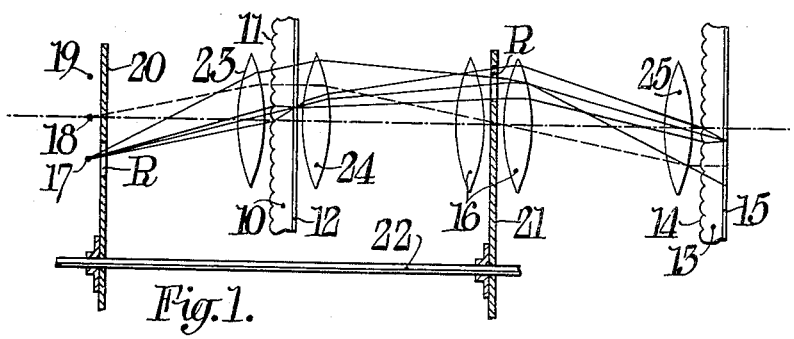
Figure 2:
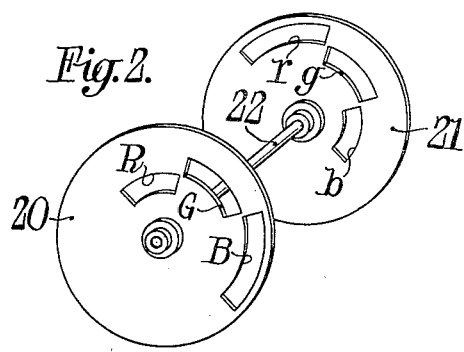
Figure 3:
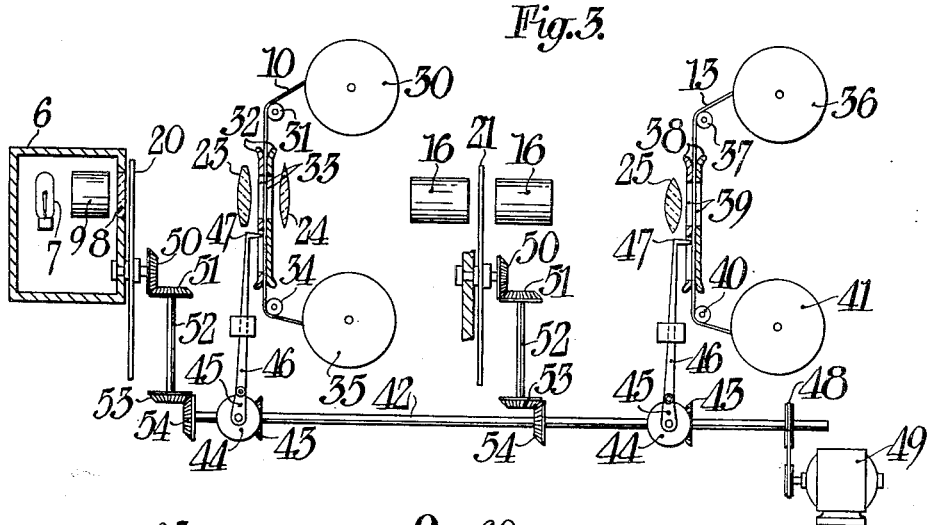
Figure 4:
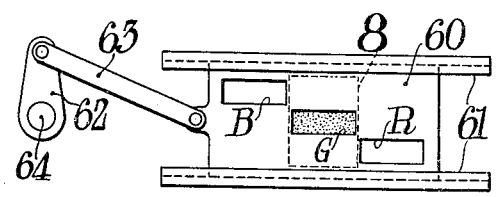

The novel features which I believe to be characteristic of my invention are set forth with particularity in the appended claims. My invention itself, however, both as to its organization and method of operation will best be understood by reference to the following description taken in connection with the accompanying drawing in which Fig. 1 shows diagrammatically one suitable arrangement whereby my invention may be practiced, the invention in the instance shown being adapted for printing at a one to one ratio; Fig 2 shows one type of shutter diaphragm which may be used; Fig. 3 is a sectional side elevation of an apparatus for effecting the printing of a series of pictures; and Fig. 4 shows an alternative form of shutter which may be used for selectively masking the light source.

Referring to the drawing I have shown an original film 10, provided with any well known type of goffering which may comprise transverse cylindrical lenticulations 11, and having a developed image layer 12 comprising a plurality of minute color separation images as is well understood. A copy film 13 upon which it is desired to reproduce the film 10 is also provided with transverse cylindrical lenticulations 14 and has a sensitized layer 15. The two films 10 and 13 are spaced on either side of a printing objective 16 with their embossed sides facing the light source which as shown comprises three separate sources 17, 18 and 19. A masking member or shutter diaphragm 20 which may be an apertured disk as shown in Fig. 2 is placed in front of the three light sources 17, 18 and 19 while a similar masking member 21 is positioned in the printing objective 16. It will be understood that the conventionalized objective 16 will in practice comprise a special objective of two components each having a plurality of lenses which is well known to those skilled in this art. The two masking members 20 and 21 are preferably connected together as by being mounted on a common shaft 22 so that when the light sources 17, 18 and 19 are successively unmasked by the member 20 the corresponding portions of the objective 16 will be unmasked by the member 21. As best shown in Fig. 2, the members 20 and 21 are provided with three arcuate slots, R, G and B and r, g and b respectively which are radially and angularly spaced so that they will be in optical alinement when placed in the printer. As shown, the three slots for printing the usual three color separation images in succession occupy only an angular space of 180 degrees on the members 20 and 21. This arrangement permits the members 20 and 21 to be rotated continuously since all three light sources are masked for a time during which the films 10 and 13 may be advanced, by any suitable mechanism, to bring another frame into printing position.

It is of course obvious that the selective masking of the light sources and the corresponding portions of the printing objective may be accomplished by means of hand operated masks or any other suitable means.

In the operation of the printer as described when the members 20 and 21 are moved to the position shown in Fig. 1 the apertures or slots R and R will permit light rays from the source 17 to pass through one of the color separation images on the original film 10, the corresponding portion of the objective 16 and upon the copy film 13. In order that the incident light will illuminate similar areas of the image layer 12 behind each embossed lens 11 of the original film 10 a collimating lens 23 may be interposed to cause the light source 17 to appear at infinity as viewed from the film 10. This parallel light transmitted by the lens 23 will be focused by the cylindrical lens element 11 in a narrow band behind each element 11 and on the image layer 12 and due to the angularity of the incident light these bands of light will illuminate one of the "off axis" color separation images which may be the red, as indicated and as is well understood. A second collimating lens 24 positioned behind the film 10 serves to direct the light transmitted by the illuminated color separation images toward the objective 16 which is unmasked by the slot R in the member 21. As is well understood, the light passed by the unmasked portion of the objective 16 will be imaged by the cylindrical lenses 14 on the sensitized layer 15 in the form of a plurality of bands each of which occupies a third of the area behind each of the lens elements 14. In order to locate these image bands on the copy film 13 so that they will occupy the proper positions relative to the filter to be used in projection a suitable compensating lens 25 may be placed in front of the copy film 13.

After printing an "off axis" color image which has been assumed to be the red, the center color separation image, usually the green, may be printed by moving the members 20 and 21 so that the slots G and g will unmask the center light source 18 and the center portion of the objective 16. As was the case in printing the red images, the green images on the original film will alone be illuminated and the slot g near the objective will restrict the light to the center portions of the sensitive layer 15 behind each lens element 14. The third or blue separation image may then be printed as was the red by unmasking the light source 19 and the corresponding portion of the objective 16. After printing all three color components of a frame as above described and with all three light sources masked by the blank portion of the member 20 the two films 10 and 13 may be advanced in any well known manner to bring another frame into position to be printed as above described. It will be obvious that the film advancing means may be synchronized with the rotating members 20 and 21 to provide a continuously operating mechanism for printing the film frame by frame and one suitable arrangement will now be described In the apparatus shown in Fig. 3, the negative film 10 from a supply reel 30 is trained over a guide roll 31, through gate elements 32 containing windows 33, and over a guide roll 34 to a take-up reel 35. The film 13 upon which the film 10 is to be printed is carried from a supply reel 36, over a guide roll 37, through gate elements 38 containing windows 39, and over a guide roll 40 to a take-up reel 41. Each of the two films 10 and 13 are drawn past the printing windows 33 and 39 by any ordinary intermittent feeding mechanism, which briefly includes a power shaft 42 provided with a gear 43 meshing with a gear 44, which in turn drives a crank arm 45 connected to a bar 46 having a claw 47 which engages the perforations in the film, as is well known. The shaft 42 may be driven in any suitable manner, as by a belt and pulley 48 driven from a motor 49.

The shutters 20 and 21 operate synchronously with the feeding mechanisms of the two films to expose them while they are at rest, these shutters being driven in any suitable way, as by gears 50, 51 through a short vertical shaft 52 driven through gears 53, 54 by the shaft 42, which, as noted above, also drives the film feeding mechanisms.

Instead of utilizing three separate light sources as shown in Fig. 1, the illuminating system shown in Fig. 3 employs a single lamp 7 the light from which is concentrated on a ground glass 8 by a condenser 9. The ground glass 8 in this arrangement constitutes a secondary source of light which serves effectively the purpose served by the three separate sources 17, 18 and 19 above described.

In Fig. 4 I have shown an alternative form of masking member which may be used instead of the disks 20 and 21. In this arrangement a plate 60 provided with three offset slots R, G and B is mounted to be reciprocated in slide ways 61. Reciprocatory movement may be imparted to the plate 60 by means of a crank arm 62 and a connecting rod 63. The crank arm 62 is carried by a shaft 64 which is suitably connected to be driven from the main shaft 42. It is to be understood that a masking member similar to this one but with the slots arranged in reverse order will be positioned in the objective 16 and that a suitable shutter arrangement will be provided for masking the light source during the return movement of the reciprocating shutters.

If it is desired to print from film having transverse lenticulations onto film provided with longitudinal lenticulations or vice versa, it is necessary only to arrange the masking members so that the slots therein extend in a direction parallel to the lenticulations on the corresponding film. In the case of reciprocating mask shown in Fig. 4, this can readily be accomplished by mounting it to reciprocate in a direction parallel to the lenticulations on the film it is used to selectively unmask. In order to unmask properly a longitudinally embossed film with a slotted rotary shutter, the shutter is mounted so that a line passing through its center of rotation and the optical axis of the printer is perpendicular to the lenticulations on the film, which is, of course, the same relation used in connection with transversely lenticulated film. In any event, the proper orientation between either film and its corresponding masking member may be obtained by choosing either the position of the masking member or the direction of travel of the film and then locating the other to satisfy the conditions outlined above.

Thus far my invention has been described as applied to printing at a one to one ratio. However, the method involved enables the carrying out of a printing operation on either an enlarged or reduced scale and this feature forms a very important part of my invention. In an ordinary duplicating printer for lenticular film the difficulty of keeping the apparent angles subtended by the filters the same in the print as in the original makes it next to impossible to print on an altered scale. In the apparatus of my invention each color component image is printed separately and the angle of the filters in taking the original is independent of the angle of the filters in projecting the copy film. This being true, all that is necessary to print on an enlarged or reduced scale is to change the ratio of the object and image distances i. e. the magnification of the rear component of the objective 16. Also, since in practicing my invention the filter angles in taking do not necessariy correspond to the angles of the filters in projection, it is possible with the aid of my invention to take the original film with a lens of small aperture such as f.4 and to project the copy film with a lens of larger aperture such as f.2. This is very advantageous in that it is difficult to obtain short focal length large aperture lenses for taking which fulfill the condition of lenticular film i. e. all parts of the lens are visible from all parts of the frame on the film, while it is relatively simple to obtain long focal length lenses of large aperture for projection purposes.

Another advantage arising from the independence of the apertures subtended in taking and in projecting the printed film is that the color ratio may be corrected in the printer thereby making it unnecessary to cut out part of the light to adjust this ratio when projecting on a screen.

For the purpose of explaining my invention in detail, I have described it as applied to the printing of goffered film bearing three color separation images. However, it is obviously equally applicable to the printing of goffered film bearing two separated images and these images may correspond to two stereoscopic views as well as to separation images of a two color process. In fact my invention contemplates the duplication of a goffered film regardless of the nature of the image or images carried thereby. Various modifications of my invention will readily suggest themselves to persons skilled in the art without departing from the scope of my invention as set forth in the appended claims.

What I claim as new and desire to secure by Letters Patent of the United States is:

1. An optical system for duplicating lenticular film bearing separation images on lenticular film in which the lenticulations of both films face the incident light comprising a source of light and an objective disposed on opposite sides of the original film to be duplicated, means for selectively unmasking portions of the light incident on the original film to illuminate successively each separation image thereon and means associated with the objective for restricting the light transmitted thereby to the portion of the sensitive layer on the copy film corresponding to the illuminated portion of the image layer on the original film.

2. Means for printing by projection and on an altered scale pictures on a goffered film from a goffered original film in which the goffering of each film faces the incident light, said means comprising means for illuminating separately the central portion only of each component image on the original film, an objective for imaging on the desired scale on the sensitive film the picture carried by the original film and means associated with the objective for limiting the light reaching the sensitive layer to the portions corresponding to the separation images illuminated.

3. The method of preparing a print on a linearly lenticular film from an original linearly lenticular film which comprises arranging the two films with their lenticular surfaces facing the incident light, illuminating successively each color separation image on the original film, projecting an image of the original film onto the sensitive film using only the portions of the fields of the lenticulations on the sensitive film corresponding to the color separation images being printed.

4. The method of duplicating color pictures on lenticular film by projection printing on sensitive lenticular film which comprises illuminating the embossed side of the original film with light coming successively from each of the apparent positions occupied by the color filters used in taking and simultaneously therewith restricting the light projected onto the sensitive film to the apparent positions to be occupied by corresponding color filters in projecting the copy film.

5. The method of copying photographic film having a goffering composed of parallel refracting elements which comprises arranging the goffered original film and a similarly goffered sensitive film on opposite sides of a printing objective and with their gofferings facing in the same direction, illuminating the goffered side of the original film with light incident thereon successively at the same apparent angles occupied by the several color filters used in taking and projecting an image of the original film onto the sensitive film each time the original film is illuminated using only that portion of the light coming from the apparent positions to be occupied by the respective color bands in projection.

6. In the art of color photography involving photographic elements provided with minute refracting lens elements and used in conjunction with polychromatic filters, the method of printing comprising separately and successively illuminating through the embossed side of the original each color separation image thereon and simultaneously therewith restricting the light transmitted to the copy film to the corresponding portions of the area behind each lens element on the copy film.

7. An apparatus adapted for copying goffered motion picture films comprising a source of light for illuminating the original film through its support and an objective for imaging on the sensitive film and through its support the picture on the original film, masking means in front of the light source and adapted upon rotation to restrict successively and separately the illumination to each component image on the original film, masking means associated with the objective and adapted upon rotation to restrict the light falling on the sensitive layer of the sensitive film to each portion thereof corresponding to the component image illuminated, and means for rotating both of said masking means in synchronism.

8. An apparatus adapted for copying goffered motion picture films including a light source and an objective, means for supporting the original film between the light source and the objective and means for supporting the sensitive film behind the objective, means for feeding the original and sensitive films step by step through the supporting means and with their goffered surfaces facing the incident light, and means operated in synchronism with the film feeding means for masking the light source during the time the films are in motion and adapted to unmask selectively and separately certain portions of the light source during the time the films are at rest.

9. An apparatus adapted for copying by projection an original goffered film onto a sensitive goffered film in which the goffered surface of each film faces the incident light including a source of light, means for supporting and feeding the original film in front of the light source, movable shutter means adapted to pass light rays from the source to each of the separation images on the original film in succession, means for supporting and feeding the sensitive goffered film, an objective for imaging the original film on said sensitive film, movable shutter means associated with the objective for restricting the light falling on the sensitive film to the portions thereof corresponding to the separation images illuminated on the original film, and driving means for operating both of said shutter means and said film feeding means in timed relation.

10. An apparatus adapted for copying by projection an original goffered film onto a sensitive goffered film in which the goffered surface of each film faces the incident light, a symmetrical objective between the two films, a rotatable shutter diaphragm located between the two parts of the objective, a light source, a rotatable shutter diaphragm between said source and the original film, means for rotating the shutter diaphragms in synchronism, means for advancing the two films step by step, and means for operating in timed relation said shutter diaphragm rotating means and said film advancing means.

11. Projection printing apparatus for duplicating the picture carried by an original goffered film on a goffered film provided with a sensitive layer comprising an objective for forming an image of the picture carried by said original film, means for supporting said sensitive film in the plane of the image and with its goffering facing the objective, means for illuminating selectively and through the original film each separate color separation component of said picture whereby the image formed by said objective at any one time corresponds to a single color component, and means for restricting, selectively, the image bearing light incident on said sensitive film to the angle to be subtended at the film by any one of the filter bands used in subsequent projection of the printed film.

FORDYCE TUTTLE